(12) United States Patent
Hanna et al.

(10) Patent No.: US 7,054,905 B1
(45) Date of Patent: May 30, 2006

(54) REPLACING AN EMAIL ATTACHMENT WITH AN ADDRESS SPECIFYING WHERE THE ATTACHMENT IS STORED

(75) Inventors: Stephen R. Hanna, Bedford, MA (US); David C. Douglas, Concord, MA (US); Yassir K. Elley, Waltham, MA (US); Radia J. Perlman, Acton, MA (US); Sean J. Mullan, Dublin (IE); Anne H. Anderson, Acton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/539,269

(22) Filed: Mar. 30, 2000

(51) Int. Cl.
*G06F 15/16* (2006.01)
*H04L 9/00* (2006.01)

(52) U.S. Cl. .................. 709/206; 709/229; 713/168
(58) Field of Classification Search ........ 709/200–207, 709/229; 711/216; 713/151, 168; 726/22, 726/24
See application file for complete search history.

(56) References Cited

U.S. PATENT DOCUMENTS

| | | | | |
|---|---|---|---|---|
| 5,579,519 A * | 11/1996 | Pelletier | .................. | 717/139 |
| 5,781,901 A * | 7/1998 | Kuzma | ................... | 707/10 |
| 5,812,669 A * | 9/1998 | Jenkins et al. | ............... | 713/161 |
| 5,889,943 A * | 3/1999 | Ji et al. | ................ | 713/201 |
| 5,903,652 A * | 5/1999 | Mital | .................. | 705/78 |
| 5,903,723 A * | 5/1999 | Beck et al. | .............. | 709/200 |
| 6,009,462 A | 12/1999 | Birrell et al. | .............. | 709/206 |
| 6,092,101 A * | 7/2000 | Birrell et al. | ............... | 709/206 |
| 6,138,104 A * | 10/2000 | Marchak et al. | ............... | 705/9 |
| 6,182,219 B1 * | 1/2001 | Feldbau et al. | ............. | 713/176 |
| 6,243,466 B1 * | 6/2001 | Young et al. | ................. | 380/28 |
| 6,275,848 B1 * | 8/2001 | Arnold | ................... | 709/206 |
| 6,292,825 B1 * | 9/2001 | Chang et al. | ............... | 709/206 |
| 6,314,454 B1 * | 11/2001 | Wang et al. | ............... | 709/206 |
| 6,324,587 B1 * | 11/2001 | Trenbeath et al. | .......... | 709/310 |

(Continued)

FOREIGN PATENT DOCUMENTS

EP    0 886 228 A2    6/1998

(Continued)

*Primary Examiner*—William C. Vaughn, Jr.
*Assistant Examiner*—David England
(74) *Attorney, Agent, or Firm*—Park, Vaughan & Fleming, LLP

(57) ABSTRACT

One embodiment of the present invention provides a system that replaces an attachment to an email message with a reference to a location where the attachment is stored. Upon receiving the email message, the system examines the email message to determine if the email message includes an attachment. If the email message includes the attachment, the system stores the attachment at a location on a communication network from which the attachment can be retrieved. The system also modifies the email message by replacing the attachment with a reference specifying the location of the attachment, and sends the modified email message to a recipient of the email message. In one embodiment of the present invention, the recipient receives the modified email message and uses the reference specifying the location of the attachment to retrieve the attachment across the communication network.

27 Claims, 3 Drawing Sheets

U.S. PATENT DOCUMENTS

| | | | | |
|---|---|---|---|---|
| 6,327,612 B1 * | 12/2001 | Watanabe | | 709/206 |
| 6,356,937 B1 * | 3/2002 | Montville et al. | | 709/206 |
| 6,397,261 B1 * | 5/2002 | Eldridge et al. | | 713/171 |
| 6,442,686 B1 * | 8/2002 | McArdle et al. | | 713/151 |
| 6,505,236 B1 * | 1/2003 | Pollack | | 709/206 |
| 6,553,494 B1 * | 4/2003 | Glass | | 713/186 |
| 6,629,122 B1 * | 9/2003 | Yotsukura | | 718/101 |
| 6,760,752 B1 * | 7/2004 | Liu et al. | | 709/206 |
| 6,839,741 B1 * | 1/2005 | Tsai | | 709/217 |

FOREIGN PATENT DOCUMENTS

| | | |
|---|---|---|
| WO | WO 98/58332 | 12/1998 |
| WO | WO 99/63709 | 12/1999 |

* cited by examiner

REPLACING AN EMAIL ATTACHMENT WITH AN ADDRESS SPECIFYING WHERE THE ATTACHMENT IS STORED

BACKGROUND

1. Field of the Invention

The present invention relates to computer systems and electronic mail. More specifically, the present invention relates to a method and an apparatus for replacing an attachment to an email message with a reference to a location where the attachment is stored.

2. Related Art

The advent of computer networks has led to an explosion in the development of applications that facilitate rapid dissemination of information. In particular, electronic mail is becoming the predominant method for communicating textual and other non-voice information. Using electronic mail, it is just as easy to send a message to a recipient on another continent as it is to send a message to a recipient within the same building. Furthermore, an electronic mail message typically takes only a few minutes to arrive, instead of the days it takes for conventional mail to snake its way along roads and through airports.

Electronic mail messages commonly include attachments, which are typically files containing documents, or other types of data, that accompany the email message. However, using email attachments can give rise to a number of problems. (1) Attachments can create a burden for an email system. If an email message with a large attachment is sent to a large number of people (for example a baby picture sent to all 30,000 people in a company), the process of sending the attachment will take up a large amount of network bandwidth. Also, storing the attachment in a large number of mailboxes will take up a large amount of storage space. Furthermore, messages containing attachments may persist in mailboxes for a large period of time because people are not always diligent about reading and deleting email messages. (2) A user may accidentally forward an attachment. This is particularly a problem if the attachment contains confidential information that was not intended to be forwarded. (3) It is hard to control access to an attached file because anyone who receives a copy of the file can do anything they want with it. (4) Once a file is sent in an email, it is hard to subsequently update the file. It is possible to send a follow-on email, but this process is cumbersome. Furthermore, if the recipient makes changes to the file, it is hard to merge these changes back into the original file.

One method for overcoming these problems is to make the file accessible at a location on a server, and to send an address of the location, such as a uniform resource locator (URL), in the email message instead of the file. If this solution is combined with an access control/revision mechanism, it can potentially solve the above-listed problems.

However, this solution is cumbersome for a user who sends a file. Making a file available on a server requires a significant amount of effort to manually copy the file to the server, and to configure the server to make the file accessible over a communication channel. Furthermore, end users typically do not have permission to perform these operations, and establishing access/revision controls can be complicated.

What is needed is a method and an apparatus that automatically makes email attachments available on a server without requiring the attachments to be manually copied and configured on the server.

SUMMARY

One embodiment of the present invention provides a system that replaces an attachment to an email message with a reference to a location where the attachment is stored. Upon receiving the email message, the system examines the email message to determine if the email message includes an attachment. If the email message includes the attachment, the system stores the attachment at a location on a communication network from which the attachment can be retrieved. The system also modifies the email message by replacing the attachment with a reference specifying the location of the attachment, and sends the modified email message to a recipient of the email message.

In one embodiment of the present invention, the recipient receives the modified email message and uses the reference specifying the location of the attachment to retrieve the attachment across the communication network.

In one embodiment of the present invention, retrieving the attachment includes authenticating the recipient to a computer system upon which the attachment is stored.

In one embodiment of the present invention, the system can receive the email message at: an application residing on a computer system belonging to a sender of the email message; an email server through which the email message is sent; a firewall that protects at least one trusted computer system from communications across the communication network; or a gateway that converts the email message from a first format to a second format.

In one embodiment of the present invention, the system additionally allows the attachment to be updated at the location on the communication network.

In one embodiment of the present invention, the system deletes the attachment from the location on the communication network after: an expiration of a time period; sending a notification to recipients of the email message that the attachment is to be deleted; receiving a notification that all recipients of the email message have retrieved the attachment; receiving a notification that all recipients of the email message have deleted the email message; receiving a command from a sender of the email message to delete the attachment; or storing the attachment to archival storage.

In one embodiment of the present invention, the communication network includes a computer network and/or a telephone network.

In one embodiment of the present invention, if the email message includes the attachment, the system additionally asks a sender of the email message whether to replace the attachment with the reference specifying the location of the attachment, and replaces the attachment if the sender agrees to replace it.

In one embodiment of the present invention, the attachment is a file.

In one embodiment of the present invention, the reference specifying the location of the attachment includes a uniform resource locator (URL).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
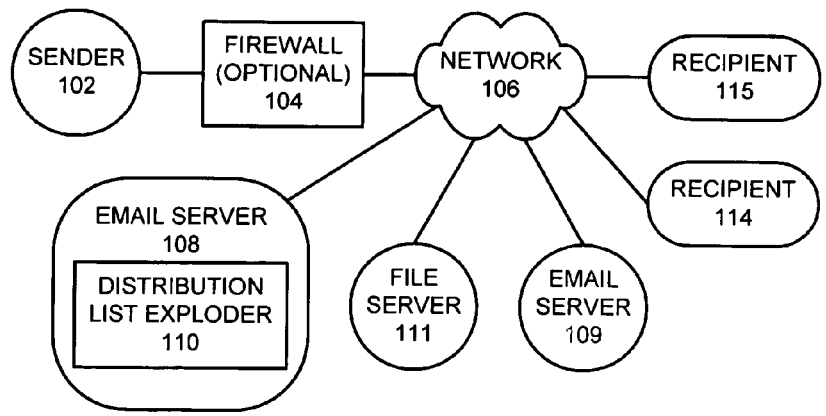
FIG. 1 illustrates computer systems coupled together by a network in accordance with an embodiment of the present invention.

FIG. 1 illustrates computer systems 102, 108–109, 111 and 114–115 coupled together by network 106 in accordance with an embodiment of the present invention. Network 106 can include any type of wire or wireless communication channel capable of coupling together computer systems. This includes, but is not limited to, a local area network, a wide area network, or a combination of networks. In one embodiment of the present invention, network 106 includes the Internet. Network 106 can also include a communication pathway through a telephone line.

The computer systems illustrated in FIG. 1 include sender 102, recipients 114–115, email servers 108–109, and file server 111. The computer system in FIG. 1 may optionally include firewall 104. Firewall 104 may be located in a separate computer system, or alternatively, may be integrated into sender 102. Note that computer systems 102, 108–109, 111, and 114–115 can generally include any type of computer system, including, but not limited to, a computer system based on a microprocessor, a mainframe computer, a digital signal processor, a personal organizer, a device controller, and a computational engine within an appliance.

More specifically, sender 102 can include any computer system that can send an email message. Recipients 114–115 can include any computer system that can receive an email message. Email servers 108–109 can include any computer systems through which an email message travels between sender 102 and recipients 114–115. Note that an email message typically travels through one or more email servers in its path from sender to recipient.

Email server 108 includes distribution list exploder (DLE) 110. DLE 110 keeps track of a set of recipients specified in a distribution list. Upon receiving an email message sent to the distribution list, DLE 110 forwards the email message to the set of recipients.

File server 111 can include any system that can store an email attachment, and that can make the attachment available across a communication channel, such as network 106. In one embodiment of the present invention, file server 111 is implemented as a web server. Note that file server 111 may exist within another computer system, such as email server 108, or may exist in a stand-alone computer system.

Firewall 104 can include any mechanism that protects sender 102 from communications across network 106. All communications between sender 102 and network 106 pass through firewall 104, which allows firewall 104 to screen these communications for security purposes.

Path of an Email Message

Figure 2:
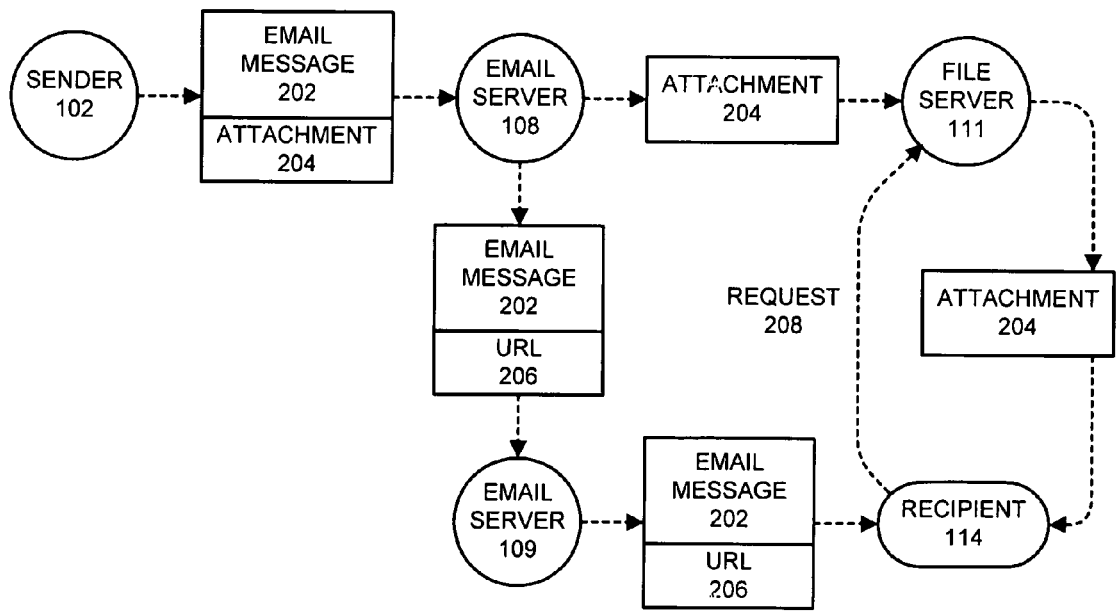
FIG. 2 illustrates how an email message with an attachment travels between computer systems in accordance with an embodiment of the present invention.

FIG. 2 illustrates how an email message 202 with an attachment 204 travels between computer systems in accordance with an embodiment of the present invention. First, sender 102 sends email message 202 (including attachment 204) to email server 108. Note that email message 202 is addressed to recipient 114, but the email system automatically directs email message 202 through email server 108.

Also note that attachment 204 can include any type of file or other data that can be attached to an email message. For example, attachment 204 can include a document, a graphical image or a data file.

Email server 108 sends attachment 204 to file server 111 so that file server can make attachment 204 available over network 106 at an address specified by URL 206. Email server 108 also forwards email message 202 along with URL 206 to email server 109. Email server 109 then sends email message 202 and URL 206 to recipient 114 (potentially through other email servers). Email server 108 can also send email message 202 and URL 206 directly to recipient 114 without passing through email server 109.

Upon receiving email message 202 and URL 206, recipient 114 uses URL 206 to send a request 208 for attachment 204 to file server 111. In response to request 208, file server 111 sends attachment 204 to recipient 114.

Figure 2A:
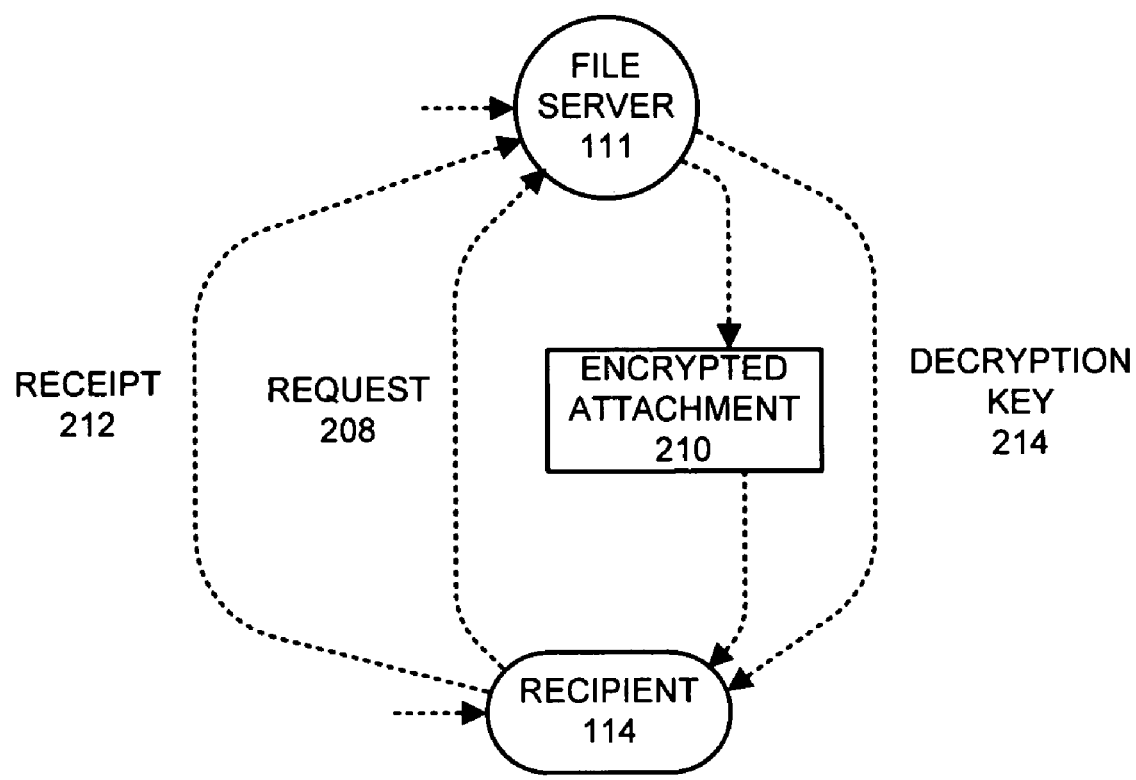
FIG. 2A illustrates an alternate method for delivering an attachment in accordance with an embodiment of the present invention.

FIG. 2A illustrates an alternate method for delivering an attachment in accordance with an embodiment of the present invention. In this embodiment, file server 111 sends encrypted attachment 210 to recipient 114 in response to request 208. Recipient, in turn, sends receipt 212 to file server 111 acknowledging receipt of encrypted attachment 210. Note that receipt 212 may include a hash of encrypted attachment 210 to provide a means of proving the contents of the received attachment. In response to receipt 212, file server 111 sends decryption key 214 to recipient 114.

Process of Replacing an Attachment with a Reference

Figure 3:
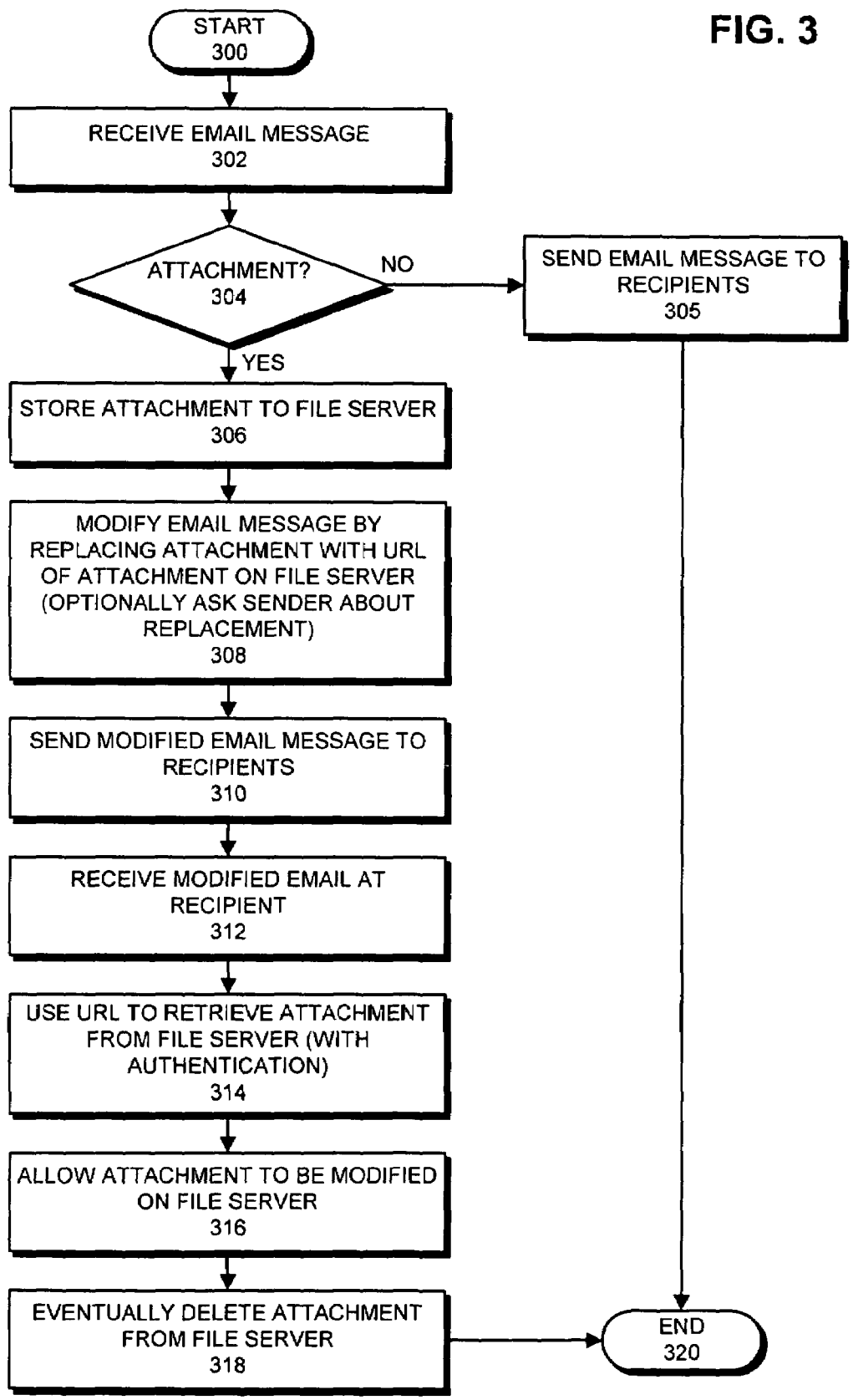
FIG. 3 is a flow chart illustrating the process of replacing an email attachment with a reference to a location where the attachment is stored in accordance with an embodiment of the present invention.

FIG. 3 is a flow chart illustrating the process of replacing an email attachment with a reference to a location where the attachment is stored in accordance with an embodiment of the present invention. Note that this process can take place in a number of different locations, including within an email client application on sender 102, at email server 108, at email server 109, at firewall 104, at a gateway that changes the format of email message 202 (perhaps located within firewall 104), or at any other computer system that is capable of performing the process. Alternatively, the process can be split up between multiple computer systems.

Note that if the process takes place outside of sender 102 and recipient 114, the system can be implemented without modifying existing email applications on sender 102 and recipient 114.

The system starts by receiving an email message 202 (step 302). If the email message 202 does not include an attachment 204, then the system sends email message 202 to recipient 114 (step 305). Note that sending email message 202 to recipient 114 may include waiting for recipient 114 to retrieve email message 202 from an email server, such as email server 109.

If email message 202 includes attachment 204, the system stores attachment 204 to file server 111 (step 306). In one embodiment of the present invention, the system sets up access controls on file server 111 so that only authorized entities are able to view and/or modify attachment 204. A default set of access controls allows a sender of an email message to read from and write to the associated attachment, while recipients are only allowed to read from the attachment.

As a performance enhancement, the system may additionally merge references to files that have already been stored to avoid storing them twice. In this case, it may be desirable to use a different URL to refer to the same file, so that the file can be copied if one of the versions of the file is later updated.

In one embodiment of the present invention, the system requires administrative approval before making attachment 204 available on file server 111.

Next, the system modifies email message 202 by replacing attachment 204 with URL 206 (or any other reference for the location of attachment 204 on file server 111) (step 308). Note that if the replacement process is carried out on sender 102, then the system can easily ask the user if the user wants to replace the attachment with URL 206.

Carrying out the replacement process on sender 102 also allows the system to create a digital signature for email message 202 including URL 206. Otherwise, if email message 202 is modified after a digital signature is created for email message 202, then the modification process will invalidate the digital signature.

The modified email message 202, including URL 206, is then sent to all recipients, including recipient 114 (step 310). In one embodiment of the present invention, the last component in URL 206 matches the filename of the original attachment 204 so that the attachment can be identified in case the body of email message 202 refers to the attachment 204 by name. In one embodiment of the present invention, preceding components in URL 206 are chosen to distinguish attachments with identical names.

A number of methods can be used to send email to recipients on a distribution list through a DLE, such as DLE 110. (1) The system can place all recipients on an access control list. (2) The system can put the alias for the distribution list on the access control list and can require recipients to prove membership in the alias (or some other related group). (3) The system can put the alias on the access control list, and can determine whether a recipient is on the alias when the recipient attempts to access the attachment.

Upon receiving modified email message 202 including URL 206 (step 312), recipient 114 uses URL 206 to retrieve attachment 204 from file server 111 (step 314). This may involve allowing a user to explicitly request attachment 204 by clicking on URL 206.

In order to receive attachment 204, recipient 114 may have to be authenticated to file server 111. This can be accomplished using any of a number of authentication mechanisms, such as a password, a shared secret, public key cryptography and/or digital certificates. Attachment 204 may additionally be encrypted to provide additional security.

One of the advantages of the above-described embodiment is that it can provide better proof of receipt of a file. Proof of receipt is rarely provided for email messages. By forcing recipient 114 to log onto file server 111 to receive attachment 204, proof of receipt can be obtained.

However, proving the exact contents of the attachment received is more difficult. In order to do so, one embodiment of the present invention delivers an encrypted version of attachment 204 to recipient 114. Recipient 114 must sign a receipt (possibly including a hash of the encrypted attachment) in order to receive the decryption key.

At a later point in time, the system allows attachment 204 to be modified on file server 111 subject to the above-described access control rules (step 316).

Eventually, the system deletes attachment 204 from file server 111. This deletion process can take place in a number of different ways. It can take place automatically after an expiration of a time period. It can take place after sending a notification to recipients of the email message that the attachment will be deleted. It can take place after receiving a notification that all recipients of the email message have retrieved the attachment. It can take place after receiving a notification that all recipients of the email message have deleted the email message. It can take place after receiving a command from a sender of the email message to delete the attachment (perhaps after some nagging). Alternatively, attachment 204 can be stored in a user's workspace so that the user will delete it during a normal cleanup operation. Note that it is often desirable to store attachment 204 to archival storage before deleting it from file server 111, so that it can to retrieved at a later time if necessary.

In one embodiment of the present invention, the system allows recipient 114 to forward URL 206 to another recipient and to delegate its access privileges to the other recipient if sender 102 does not object.

In one embodiment of the present invention, sender 102 can update attachment 204 by sending a follow-up email message with an indication that attachment 204 should be replaced with a new version of attachment 204. Upon receiving this follow-up email message, the system performs the replacement. This can alternatively be accomplished through an explicit command entered through an email program.

In one embodiment of the present invention, the system allows sender 102 or a system administrator to view a list of attachments that have been sent or received, and to search this list by filename or file contents.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for replacing an attachment to an email message with a reference to a location of the attachment, comprising:
   receiving the email message;
   examining the email message to determine if the email message includes an attachment; and
   if the email message includes the attachment, asking a sender of the email message whether to replace the attachment with a reference specifying the location of the attachment;

if the sender agrees to replace the attachment,
storing the attachment at a location on a communication network from which the attachment can be retrieved,
modifying the email message by replacing the attachment with a reference specifying the location of the attachment on the communication network,
sending the modified email message to a recipient of the email message,
providing proof of receipt of the contents of the attachment, wherein providing proof of receipt involves:
delivering an encrypted version of the attachment,
receiving a receipt for the encrypted version of the attachment, wherein the receipt includes a hash of the encrypted attachment, and
in response to receiving the receipt for the encrypted version, sending the decryption key for the attachment, wherein sending the decryption key for the attachment in response to receiving the receipt for the encrypted version proves reception of the exact contents of the attachment, and
deleting the attachment from the location on the communication network after one of:
receiving a notification that all recipients of the email message have retrieved the attachment, and
receiving a notification that all recipients of the email message have deleted the email message.

2. The method of claim 1, further comprising:
receiving the modified email message at the recipient; and
using the reference specifying the location of the attachment to retrieve the attachment across the communication network.

3. The method of claim 2, wherein retrieving the attachment includes authenticating the recipient to a computer system upon which the attachment is stored.

4. The method of claim 1, wherein receiving the email message includes receiving the email message at one of,
an application residing on a computer system belonging to a sender of the email message;
an email server through which the email message is sent;
a firewall that protects at least one trusted computer system from communications across the communication network; and
a gateway that converts the email message from a first format to a second format.

5. The method of claim 1, further comprising allowing the attachment to be updated at the location on the communication network.

6. The method of claim 1, further comprising deleting the attachment from the location on the communication network after at least one of:
an expiration of a time period;
sending a notification to recipients of the email message that the attachment is to be deleted;
receiving a command to delete the attachment from a sender of the email message; and
storing the attachment to archival storage.

7. The method of claim 1, wherein the communication network includes at least one of:
a computer network; and
a telephone network.

8. The method of claim 1, wherein the attachment is a file.

9. The method of claim 1, wherein the reference specifying the location of the attachment includes a uniform resource locator (URL).

10. A computer-readable storage medium storing instructions that when executed by a computer cause the computer to perform a method for replacing an attachment to an email message with a reference to a location of the attachment, the method comprising:
receiving the email message;
examining the email message to determine if the email message includes an attachment; and
if the email message includes the attachment, asking a sender of the email message whether to replace the attachment with a reference specifying the location of the attachment;
if the sender agrees to replace the attachment,
storing the attachment at a location on a communication network from which the attachment can be retrieved,
modifying the email message by replacing the attachment with a reference specifying the location of the attachment on the communication network,
sending the modified email message to a recipient of the email message,
providing proof of receipt of the contents of the attachment, wherein providing proof of receipt involves:
delivering an encrypted version of the attachment,
receiving a receipt for the encrypted version of the attachment, wherein the receipt includes a hash of the encrypted attachment, and
in response to receiving the receipt for the encrypted version, sending the decryption key for the attachment, wherein sending the decryption key for the attachment in response to receiving the receipt for the encrypted version proves reception of the exact contents of the attachment, and
deleting the attachment from the location on the communication network after one of:
receiving a notification that all recipients of the email message have retrieved the attachment, and
receiving a notification that all recipients of the email message have deleted the email message.

11. The computer-readable storage medium of claim 10, wherein the method further comprises:
receiving the modified email message at the recipient; and
using the reference specifying the location of the attachment to retrieve the attachment across the communication network.

12. The computer-readable storage medium of claim 11, wherein retrieving the attachment includes authenticating the recipient to a computer system upon which the attachment is stored.

13. The computer-readable storage medium of claim 10, wherein receiving the email message includes receiving the email message at one of,
an application residing on a computer system belonging to a sender of the email message;
an email server through which the email message is sent;
a firewall that protects at least one trusted computer system from communications across the communication network; and
a gateway that converts the email message from a first format to a second format.

14. The computer-readable storage medium of claim 10, wherein the method further comprises allowing the attachment to be updated at the location on the communication network.

15. The computer-readable storage medium of claim 11, wherein the method further comprises deleting the attachment from the location on the communication network after at least one of:

an expiration of a time period;

sending a notification to recipients of the email message that the attachment is to be deleted;

receiving a command to delete the attachment from a sender of the email message; and storing the attachment to archival storage.

16. The computer-readable storage medium of claim 10, wherein the communication network includes at least one of:

a computer network; and a telephone network.

17. The computer-readable storage medium of claim 10, wherein the attachment is a file.

18. The computer-readable storage medium of claim 10, wherein the reference specifying the location of the attachment includes a uniform resource locator (URL).

19. An apparatus that replaces an attachment to an email message with a reference to a location of the attachment, comprising:

an examination mechanism that examines the email message to determine if the email message includes an attachment;

a replacement mechanism, wherein if the email message includes the attachment the replacement mechanism is configured to, ask a sender of the email message whether to replace the attachment with a reference specifying the location of the attachment;

if the sender agrees to replace the attachment the replacement mechanism is further configured to, store the attachment at a location on a communication network from which the attachment can be retrieved, modify the email message by replacing the attachment with a reference specifying the location of the attachment on the communication network, provide proof of receipt of the contents of the attachment, wherein providing proof of receipt involves:

delivering an encrypted version of the attachment, receiving a receipt for the encrypted version of the attachment, wherein the receipt includes a hash of the encrypted attachment, and in response to receiving the receipt for the encrypted version, sending the decryption key for the attachment, wherein sending the decryption key for the attachment in response to receiving the receipt for the encrypted version proves reception of the exact contents of the attachment, and send the modified email message to a recipient of the email message; and a deletion mechanism that is configured to delete the attachment from the location on the communication network after one of:

receiving a notification that all recipients of the email message have retrieved the attachment, and receiving a notification that all recipients of the email message have deleted the email message.

20. The apparatus of claim 19, further comprising:

a second receiving mechanism at the recipient that is configured to receive the modified email message; and a retrieval mechanism at the recipient that is configured to use the reference specifying the location of the attachment to retrieve the attachment across the communication network.

21. The apparatus of claim 20, wherein the retrieval mechanism is configured to authenticate the recipient to a computer system upon which the attachment is stored.

22. The apparatus of claim 19, wherein the replacement mechanism is located on one of, an application residing on a computer system belonging to a sender of the email message;

an email server through which the email message is sent;

a firewall that protects at least one trusted computer system from communications across the communication network; and a gateway that converts the email message from a first format to a second format.

23. The apparatus of claim 19, further comprising an updating mechanism that is configured to allow the attachment to be updated at the location on the communication network.

24. The apparatus of claim 19, wherein the deletion mechanism is further configured to delete the attachment from the location on the communication network after at least one of:

an expiration of a time period;

sending a notification to recipients of the email message that the attachment is to be deleted;

receiving a command to delete the attachment from a sender of the email message; and storing the attachment to archival storage.

25. The apparatus of claim 19, wherein the communication network includes at least one of:

a computer network; and a telephone network.

26. The apparatus of claim 19, wherein the attachment is a file.

27. The apparatus of claim 19, wherein the reference specifying the location of the attachment includes a uniform resource locator (URL).

\* \* \* \* \*